United States Patent
Tadaki et al.

(10) Patent No.: US 7,968,163 B2
(45) Date of Patent: Jun. 28, 2011

(54) RESIN-COATED ALUMINUM SEAMLESS CAN BODY FEATURING SUPERIOR RESISTANCE AGAINST CRACKS IN THE CAN WALL DURING DISTRIBUTION, AND AGAINST FLANGE CRACKING

(75) Inventors: Yasufumi Tadaki, Kanagawa (JP);
Nobuo Tsuchiya, Kanagawa (JP);
Kazuhiro Nishida, Kanagawa (JP);
Seitaro Kanazawa, Kanagawa (JP)

(73) Assignee: Toyo Seikan Kaisha, Ltd, Tokyo (JP)

( * ) Notice: Subject to any disclaimer, the term of this patent is extended or adjusted under 35 U.S.C. 154(b) by 1130 days.

(21) Appl. No.: 10/561,913

(22) PCT Filed: Jun. 22, 2004

(86) PCT No.: PCT/JP2004/008751
§ 371 (c)(1),
(2), (4) Date: Feb. 21, 2007

(87) PCT Pub. No.: WO2004/113181
PCT Pub. Date: Dec. 29, 2004

(65) Prior Publication Data
US 2007/0218226 A1 Sep. 20, 2007

(30) Foreign Application Priority Data
Jun. 23, 2003 (JP) ................................. 2003-178729

(51) Int. Cl.
*B32B 15/09* (2006.01)
*B32B 27/06* (2006.01)
*B65D 1/00* (2006.01)

(52) U.S. Cl. .................... 428/35.8; 428/35.9; 428/36.6; 428/36.7; 220/62.22

(58) Field of Classification Search .................. 428/34.1, 428/35.7, 35.8, 36.5, 36.9, 36.91, 35.9, 36.6, 428/36.7; 220/62.11, 62.12, 62.13, 62.22
See application file for complete search history.

(56) References Cited

U.S. PATENT DOCUMENTS
4,260,419 A * 4/1981 Robertson ..................... 420/534
6,099,924 A * 8/2000 Nakamaki et al. ........... 428/35.8

FOREIGN PATENT DOCUMENTS
JP 08-199273 8/1996
(Continued)

Primary Examiner — Walter B Aughenbaugh
(74) Attorney, Agent, or Firm — Browdy and Neimark, PLLC

(57) ABSTRACT

A can that features superior resistance against puncture under higher puncture strength, and superior resistance against flange cracking. The resin-coated aluminum seamless can body of the present invention features superior resistance against cracks in the can wall during distribution, and resistance against flange cracking, wherein the inner and/or outer surface of the can of the aluminum seamless can 10 is coated with a layer of thermo-plastic resin, the thickness of the thermoplastic resin layers of the inner surface and the outer surface is a total of 2-50 μm, with a minimum thickness of the aluminum plate of the side wall of the can 0.110 mm or less, and the tensile stress at break measured for the aluminum plate that is removed from the thermo-plastic resin of the side wall of the can in the direction of the circumference of the can, is 450 MPa or less, the product of the minimum thickness of a plate of the side wall of the can including the thermo-plastic resin <t> (mm), and the tensile stress measured of the side wall of the can including the thermo-plastic resin in the direction of height of the cans (MPa), is <t xs>≧30. The thermoplastic resin layer is a thermo-plastic polyester resin layer having oriented crystals, wherein the heat of fusion of the polyester resin layer is not less than 15 J/g.

5 Claims, 9 Drawing Sheets

FOREIGN PATENT DOCUMENTS

| | | |
|---|---|---|
| JP | 09-285832 | 11/1997 |
| JP | 09-314263 | 12/1997 |
| JP | 2001-246695 | 9/2001 |

* cited by examiner

RESIN-COATED ALUMINUM SEAMLESS CAN BODY FEATURING SUPERIOR RESISTANCE AGAINST CRACKS IN THE CAN WALL DURING DISTRIBUTION, AND AGAINST FLANGE CRACKING

BACKGROUND OF THE INVENTION

1. Field of the Invention

The present invention relates to a resin-coated aluminum seamless can body for the contents of beverages such as carbonic beverages, beer, juice, alcoholic beverages and water. More specifically, the invention relates to a resin-coated aluminum seamless can body which features superior resistance against cracks in the can wall during distribution, and against flange cracking.

2. Prior Art

Conventionally, draw-ironed aluminum cans that are widely used for beverage cans and such are comprised of a can barrel, which is continuously joined to the bottom plate of the can, having been produced by punching an aluminum plate into a disk-shape to make a blank, and then decreasing the thickness of a plate of the can wall by drawing or redraw-ironing, and thus narrowing the upper portion of the can wall, so as to mount a lid on the opening (the neck in portion). This method of forming cans is commonly used because it decreases the thickness of a plate of the can wall itself, without decreasing the thickness of a plate of the bottom of the can, which is necessary for resistance against pressure, as well as significantly reduces the material as compared to conventional three-pieced cans.

Furthermore, in recent years, the thickness of a plate of the can wall has been decreasing as a cost-cutting policy in producing cans by minimizing the amount of material used for the cans. For instance, as for the cylindrical can side wall, the drawing process is followed by redraw-ironing, which decreases the thickness of the plate by a ratio of as much as 60 to 70 percent, using an aluminum plate wherein the thickness of a plate is 0.3 mm before after forming, and by a DI process that decreases the thickness of a plate of the side wall of the can by around 0.10 mm. Moreover, research and development on decreasing the thickness of a plate of the can wall continues to be conducted.

Therefore, because the carbonic gas itself causes internal pressure on the can wall, aluminum drawn and ironed cans with a significantly decreased thickness of a plate of the can wall are often applied to cans containing beer and carbonated beverages. Furthermore, in the case of cans with contents such as tea beverages, which do not cause internal pressure on the can wall, the cans are filled with liquid nitrogen gas (pressurized can).

As for these beverage cans filled with contents in draw-ironed aluminum cans with a decreased thickness of a plate of the side wall of the can, because of the extreme decrease in the thickness of a plate of the side wall of the can, problems during the process of distribution, such as cracks in the side wall of the aluminum plate and the contents spurting out when the can is accidentally dropped, while in a carton case or by itself, or when the can is dented (for example, when it hits against the corner of a desk or when there is any kind of small protrusion at the place where it is dropped), need to be improved upon. That is, after the can is filled with its contents and after the lid has been forced on, during the process of distribution or handling, if a protrusion or so forth from the outside of the can is pressed against the can wall, or if the can experiences any shock from being dropped, in the case of cans with a very thin side wall, cracks have occurred in the side wall of the can (in the present invention these may be called "cracks in the can wall").

Particularly, in case of a pressurized can, such as carbonated beverages, where the inside of the can is pressurized, a small hole immediately develops into the origin of a crack, and there is a risk that all of the contents of the beverage can will leak out. In Patent Reference 1 it has been proposed that, in order to improve the strength of beverage cans, specific aluminum alloys have been used as a material for the components of the can, and moreover the elongation break of the can has been improved by means of heat treatment.

Patent Reference 1: Japanese Unexamined Patent Publication (Kokai) No. 199273/1996

SUMMARY OF THE INVENTION

However, even if this material is used, when the thickness of a plate of the can wall is decreased any more, cracks in the can wall during distribution cannot be adequately reduced. Furthermore, when it is attempted to improve the resistance against cracks in the can wall by increasing the strength of the aluminum side wall of the can, flange cracking problems are more likely to occur.

It is therefore an object of the present invention to solve these problems and to provide a can that exhibits satisfactory resistance against flange cracking, even if the thickness of a plate of side wall of the cylindrical can is as thin as that or thinner than that of the conventional cans, and to provide a can that prevents cracking in the side wall of the can from occurring even when if a protrusion or so forth from the outside of the can is pressed against the can wall or if the can experiences any shock from being dropped.

That is, the object of the present invention is to provide a can that in addition to exhibiting superior puncture resistance under high degree puncture strength, it also exhibits superior resistance against flange cracking.

The inventors of this present invention have carried out various experiments in order to develop cans of which the wall has the same or more puncture strength, and features superior resistance against puncture and further, resistance against flange cracking even if the beverage can is comprised of a thinner plate, and have found out that the can of this present invention can satisfy said objects.

Specifically, the resin-coated aluminum seamless can body of the present invention is a seamless can that is obtained by draw-ironing and/or stretch-drawing, wherein the inner and/or outer surface of the can is coated with a layer of thermo-plastic resin, the thickness of the thermo-plastic resin layers of the inner surface and the outer surface is a total of 2-50 μm, with a minimum thickness of the aluminum plate of the side wall of the can 0.110 mm or less, the tensile stress at break measured for the aluminum plate that is removed from thermo-plastic resin of the side wall of the can in the direction of the circumference of the can is 450 MPa or less, and the product of the minimum thickness of a plate of the side wall of the can including the thermo-plastic resin $<t>$ (mm), and the tensile stress measured for the side wall of the can including the thermo-plastic resin in the direction of height of the can $<s>$ (MPa) is, $<t\ s>\geq 30$.

Therefore, the resin-coated aluminum seamless can body of the present invention features superior resistance against cracks in the can wall during distribution, and against flange cracking during forming, and filling and necking.

In the case of present invention, the thermo-plastic resin is polyester resin, and the thermo-plastic resin aluminum plate used is an aluminum plate that has been coated with polyester resin in advance, and decreased in initial thickness of a plate by not less than 50% by draw-ironing and/or stretch-drawing, and the polyester resin-coating of the side wall of the can is comprised of oriented crystals, and therefore the can features superior resistance against cracks in the can wall during distribution, and against flange cracking during forming, and filling and necking.

Furthermore, the resin-coated aluminum seamless can body, is an aluminum seamless can body formed by draw-ironing and/or stretch-drawing, wherein the inner and/or outer surface of the can is coated with a thermo-plastic polyester resin layer, said polyester resin layer is comprised of oriented crystals, and the parameter H, which represents the axial orientation degree of the oriented crystals of said polyester resin layer in the direction of height of the can is H≧0.5, where the heat of fusion of said polyester resin layer is not less than 15 J/g.

Therefore, the resin-coated aluminum seamless can body of the present invention features even more superior resistance against cracks in the can wall during distribution, and against flange cracking during forming, filling and necking.

In the present invention, it is possible to manufacture a can, wherein the puncture resistance is higher and the production cost is lower, even though the side wall of the cylindrical can is as thin as or thinner than that of conventional cans.

Moreover, because the measured tensile stress at break <s> for the aluminum plate of the side wall of the can, comprised of said materials in the direction of the circumference of the can, is regulated to 450 MPa or less, a can is provided, which prevents flange cracking and leaking from occurring while the cans are being filled.

Furthermore, because beverage cans utilizing the present invention are lighter in weight, the handling of beverage cans during distribution and such can also be improved.

BRIEF DESCRIPTION OF THE CODES

Figure 1:
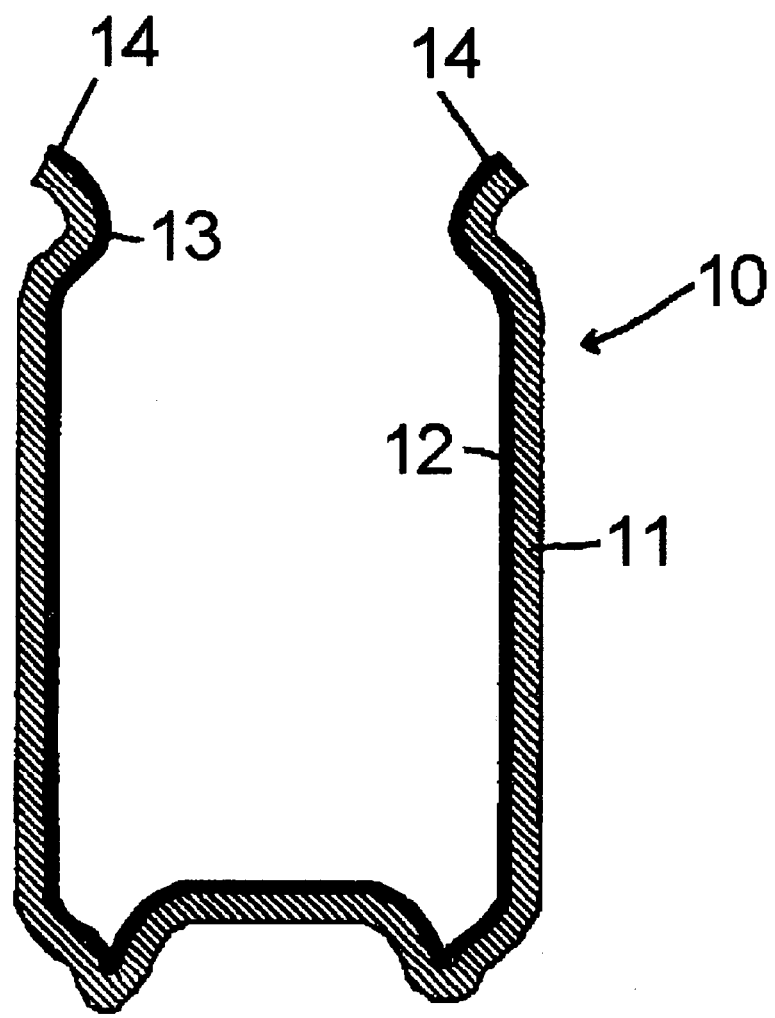
FIG. 1 is a diagram of a cross-sectional model of a resin-coated inner surface of an aluminum seamless can, according to an embodiment of the present invention.

10: resin-coated aluminum seamless can body
11: aluminum plate
12: resin layer (resin film)
13: neck in portion
14: flange portion
31: sample can
32: opening of a can
33: device that uses air to add internal pressure
34: test machine for compression
35: puncturing device
41: punch
42: ramp
Tf: thickness of a plate in the neck in portion
Tw: thickness of a plate of the side wall of the can
<t>: minimum thickness of a plate of the side wall of the can including a thermo-plastic resin layer
<s>: tensile stress measured for the side wall of the can including the thermo-plastic resin layer in the direction of height of the can

DETAILED DESCRIPTION OF THE INVENTION

The following is the explanation of the embodiment of the resin-coated aluminum seamless can body of the present invention.

FIG. 1 is a diagram of a cross-sectional model of a resin-coated aluminum draw-ironed can which illustrates the embodiment of the present invention.

Referring to FIG. 1, 10 is the resin-coated aluminum seamless can body; 11 is the aluminum plate to be used as a substrate; 12 is the resin layer coated on the inner surface side of a resin-coated aluminum draw-ironed can; 13 is a neck in portion; and 14 is the flange portion.

Furthermore, an outer resin layer could be applied to the far outer surface of the outside of the can that is not illustrated, and/or a print and varnish finishing layer.

Referring to the aluminum plate to be used as a substrate for the resin-coated aluminum draw-ironed can of the present invention, various materials of aluminum are used, such as aluminum alloys at the level of 3000, 5000, 6000 as claimed in JIS 4000.

As for composition of the aluminum plate, the following is desired, because Mn increases the temperature of re-crystallization, and changes the state of crystallization by combining with Fe in aluminum, as well as improves resistance against corrosion of the can, it is desirable that an amount of 0.1 to 1.5% Mn (percent is based on weight, the same in the following) be added. If the additive amount of Mn is less than 0.1%, sufficient resistance against corrosion cannot be obtained, and on the other hand, if the additive amount of Mn is greater than 1.5%, workability of the plate would decrease.

Because Mg improves strength, workability and resistance against corrosion of the can, it is desirable that an amount of 0.8 to 5.0% be added. If the additive amount of Mg is less than 0.8%, sufficient strength of the can cannot be obtained, and on the other hand, if the additive amount of Mg is greater than 5.0%, workability would decrease and cracks or wrinkles are more likely to occur.

Because Cu improves the strength of the can, it is desirable that an amount of 0.01 to 0.8% be added. If the additive amount of Cu is less than 0.01%, enough resistance against corrosion cannot be obtained, and on the other hand, if the additive amount of Cu is greater than 0.8%, workability would decrease.

Because Si improves the strength of the can and resistance against wearing by separating into a mixed phase with Mg, it is desirable that an amount of 0.03 to 0.6% be added. If the additive amount of Si is less than 0.03%, sufficient strength of an aluminum can cannot be obtained, and on the other hand, if the additive amount of Si is greater than 0.6%, workability would decrease in draw-ironing of the can.

Because Fe changes the state of crystallization by combining with Mn in aluminum and improves resistance against corrosion, it is desirable that an amount of 0.05 to 0.8% be added. If the additive amount of Fe is less than 0.05%, sufficient strength of the can cannot be obtained, and on the other hand if the additive amount of Fe is greater than 0.8%, workability would decrease.

While the aluminum plate of the can is, in general, desired to have a thickness of a plate of between 0.1 and 1.00 mm, in terms of strength of a can and workability, the thickness of a plate of the side wall of the can after forming (the minimum aluminum thickness of a plate of the side wall of the can except for the resin coating) is desired to have a minimum aluminum thickness of a plate of 0.110 mm or less. If the can wall has a minimum aluminum thickness of a plate greater than 0.110 mm, the material would not be decreased by decreasing the side wall of the can, which is the objective of draw-ironed or stretch-drawn cans, so as to decrease cost.

[Surface Treatment]

An aluminum plate can be provided with surface treatment to increase adhesiveness of the coating resin. The surface-treated aluminum plate may be obtained by annealing a cold-rolled aluminum plate, followed by phosphate and chromate treatment, and other kinds of organic and inorganic surface treatments, by immersing or spraying. Also, the surface can be treated by application.

When the treatment layer is formed on an aluminum plate by phosphate and chromate treatment, considering the adhesiveness of laminated resin film, an amount of chrome between 5 to 40 mg/m$^2$ in total chrome would be desirable, and between 15 to 30 mg/m$^2$ would be preferable.

When surface treatments such as phosphate treatment, chromate treatment and so on are not provided after forming, adhesiveness of resin film may decrease and cause separation after forming and washing. When the amount of total chrome containing metal and oxides is less than 5 mg/m$^2$, it is not desirable, as the adhesiveness of resin film decreases and may cause separation. Furthermore, when the amount of total chrome is greater than 40 mg/m$^2$, it is not desirable in terms of finances and the decrease in adhesiveness caused by cohesive destruction.

On the other hand, when phosphate and chromate treatment are provided on the side that is not coated in resin film, the amount of total chrome is 8 mg/m$^2$ or less. If the amount of total chrome on the outer surface is greater than 8 mg/m$^2$, it might cause unevenness of color or loss of the color quality of the metal gloss. That is because, for the outside color quality of a can, the color quality of the metal gloss is important.

To demonstrate the way the forming layers of the aluminum plate are surface-treated, the forming layers are isolated by phosphate and chromate treatment, $CrO_3$: 4 g/L, $H_3PO_4$: 12 g/L, F: 0.65 g/L, and by a known method such as chemical treatment, the grease is removed from the aluminum plate and the plate is treated with light etching, and immersed in an aqueous solution such as water.

[Resin-Coated Layer]

On the inner surface side of a can, a resin layer 12 is formed on a surface-treated aluminum plate. For resin film 12 as the resin layer coating the can, a thermo-plastic resin film such as polyester film, nylon film, polypropylene film and so on can be used which has a thickness of from 2 to 50 μm and has a relatively high transparency and superior resistance against heat.

For example, it is preferable to use a polyester film which contains a large amount of ethylene telephthalate, ethylene butyrate and ethylene isophthalate.

When polyester film is used as thermo-plastic resin film, other components can be copolymerized.

For instance, copolymerized components of dicarboxylic acid may contain aromatic dicarboxylic acids such as naphthalene dicarboxylic acid, diphenyl dicarboxylic acid, diphenyl sulfon dicarboxylic acid, diphenxyethane dicarboxylic acid, 5-natrium sulfon isophthalic acid, and phthalic acid; aliphatic dicarboxylic acid such as oxalic acid, succinic acid, adipic acid, sobacic acid, dimeric acid, maleic acid, and fumaric axid; alicyclic acid such as cyclohexane dicarboxylic acid; and oxycarboxylic acid such as p-oxybenzonic acid.

In addition, copolymerized components of glycol may contain aliphatic glycol such as propanediol, butanediol, pentanediol and neopentyl glycol; alicyclic glycol such as cyclohexane dimethanol; and aromatic glycol such as bisphenol A and bisphenol S; and polyoxyethylene glycol. The above-mentioned components of dicarboxylic acid and of glycol can be used with more than two kinds of them.

When nylon film is used as thermo-plastic resin film, polymerized compounds with diamine and dicarboxylic acid such as nylon 66, nylon 610, and nylon 612, or ring-opening polymerized compounds of lactam, such as nylon 6, nylon 11, and nylon 12 may be used.

This resin film is produced by known methods such as the T-die cast film method and the inflation method to form film, and it can be formed in compliance with, uniaxially and biaxially oriented treatment.

Furthermore, known methods such as plasma treatment for resin film surface treatment, to improve adhesiveness, or flame and coating treatment, to improve adhesiveness of urethane resin and denatured polyester resin and so on may be applied.

The resin layer 12, according to an embodiment of the present invention, contains polyester resin such as polyethylene terephthalate (PET), and this resin-coating is desirable to be a resin-coated aluminum plate before draw-ironing and substantially not to be oriented.

That is, as a biaxially oriented film laminate, when an aluminum plate is laminated after resin layer being oriented, the mechanical strength such as strength of drawing increases, however an elongation break decreases. Therefore, when a can is formed by intensive methods such as draw-ironing, non-oriented resin layer that has not been oriented is preferred because it does not cause break of resin layer and has superior workability.

Further, when biaxially oriented film is used, when it is laminated or after it is laminated, it is heated to change oriented resin layer into non-oriented layer.

On the other hand, however, there may be a problem that non-oriented resin layer that has not been oriented have less barrier effect. To improve this problem, the polyethylene/isophthalate can be structured as two layers, wherein the surface layer [A] contains the isophthalic acid in an amount of 0 to 13 mol % and the lower layer [B] contains the isophthalic acid in an amount of 4 to 20 mol %. Therefore, a can after being formed can have about the same as large barrier effect as the oriented resin layer.

As a resin-coated aluminum draw-ironed can 10 is formed by subjecting the resin-coated aluminum plate to means such as drawing, stretching and ironing, the resin is oriented and crystallized so as to increase its strength, and to improve barrier effect, resistance against corrosion, resistance against being dented, and resistance against being wounded by (hard) tools, as well as the oriented film is used.

In the present invention, it is desirable that the above-mentioned resin layer on the resin-coated metal plate, in case of the outer surface and/or inner surface of the can being resin-coated, has a thickness in a total of 2 μm or more at the thinnest portion, and especially it is more desirable that it was a thickness of 5 μm or more in terms of maintaining resistance against cracks in the can wall during distribution.

On the other hand, the maximum of the thickness is, in terms of finance, desirable to be 50 μm or less and especially 25 μm or less.

[Resin Coating on Aluminum Plate]

The resin-coated aluminum plate to be used for producing cans can be manufactured by a known preparation method, however there is more desirable ways such as a way of lamination of cast film, and a way that resin layer is directly coated on the aluminum plate by extrusion coating system. Besides, in compliance with, by dual extrusion coating system a two-layer resin layer can be coated on the aluminum plate.

[Resistance Against Flange Cracking—Tensile Stress at Break]

As a result of the inventors' diligent research, as mentioned below resistance against flange cracking has a relationship with a tensile stress at break measured for the aluminum plate of the side wall of the can except for resin coating in the direction of the circumference of the can (MPa). The direction of the circumference of the can means the direction of the circumference of the can that is perpendicular to the direction of height of the can.

As necking of a can and a lid, the curl portion of the lid that is formed in a predetermined form and the flange portion 14, formed at the opening of the can, are tied around by being held with each other from the outside by a necking roll, and further the neck in portion is affixed from the outside, and then the lid and the can are connected.

In this necking process, firstly the lifter that maintains the bottom portion of the can raises, and the can that is mounted on a lid hits the seaming chuck that compresses the can in the axial direction of the can, and then the necking roll affixes the can at the neck in portion.

By the pressure of compressing in the axial direction of the can, a tensile stress in the direction of the circumference of the can is caused to the flange portion of the can. If workability of the flange portion 14 is poor, flange cracking is caused and strength of sealing up decreases and the contents may leak out.

Figure 2:
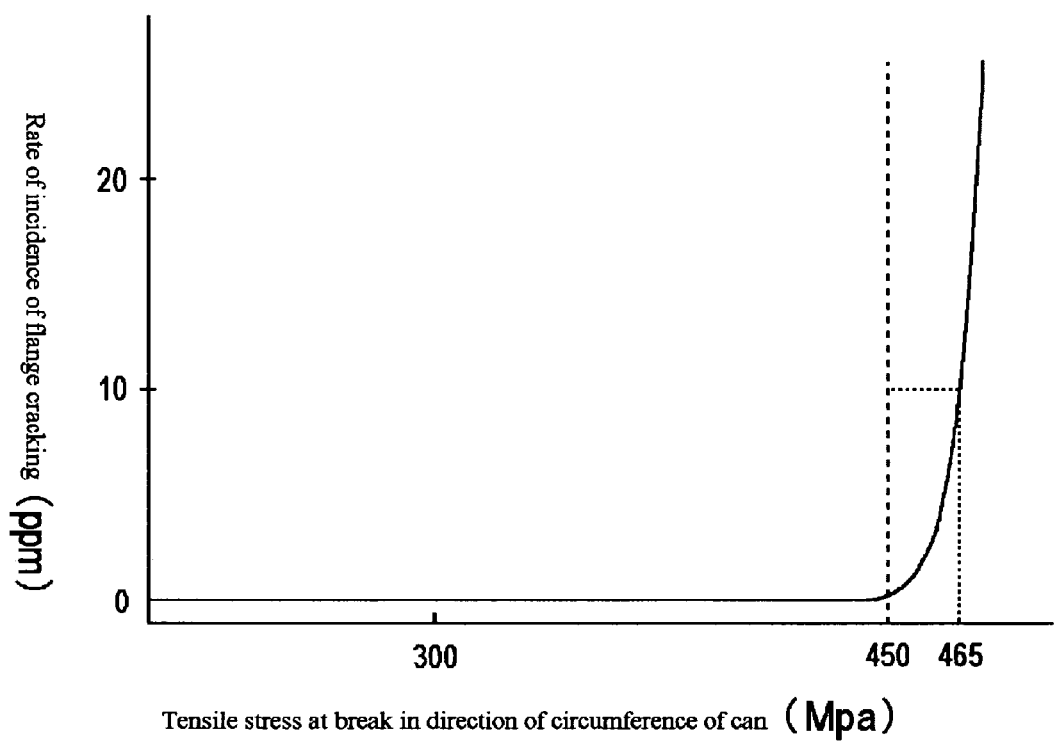
FIG. 2 is a graph illustrating the relationship between the tensile stress in the direction of the circumference of the can and a rate of incidence of flange cracking.

As showed in FIG. 2, if the tensile stress at break in the direction of the circumference of the can becomes greater than 450 MPa, flange cracking occurs when cans are being filled with the contents and necked, and the possibility of leaking increases. Therefore, in the present invention it is important to regulate that the tensile stress at break in the direction of the circumference of the can is 450 MPa or less.

[Minimum Thickness of Plate <t> Tensile Stress <s>]

As a result of collecting the cans that had cracks in the can wall during distribution and observing the form of cracks in detail, most cracks in the can wall have small dents that can be seen as the origin of a crack, having the portion as a center, the cracking portion was deformed into a diamond shape. It is disclosed that cracks in the can wall were caused by propagation of a crack that is shaped like a line, basically along one diagonal line of the diamond shape in the direction of the circumference of the can. Therefore, cracks in the can wall may be caused by the following mechanism.

1. The point of a protrusion contacts against the side wall of the can.
2. The contact portion of the side wall of the can is plastic-deformed.
3. A crack is caused that is diamond-shape and having a summit at the point of the protrusion, a diagonal line in the direction of the circumference of the can occurs.
4. When the deforming resistance against the point of the protrusion becomes greater than the strength of the resin-coated aluminum plate, cracks in the can wall are caused by the crack propagating along the diagonal line, that is in the direction of the circumference of the can.

The above-mentioned presumption leads the following conclusion.

That is, it is supposed that whether cracks in the can wall may occur or not is strongly related to tensile stress in the direction of height of the can. Then, when the tensile stress of the side wall of the can is measured in various directions and an interrelationship between <t s> and cracks in the can wall are calculated, that led to the conclusion that when the tensile stress in the direction of height of the can is adapted, the interrelationship is strongest.

In this explanation, <t> represents a minimum thickness of a plate of the side wall of the can including a thermo-plastic resin layer (mm), and <s> represents a tensile stress of the side wall of the can including a thermo-plastic resin layer (MPa).

Figure 3:
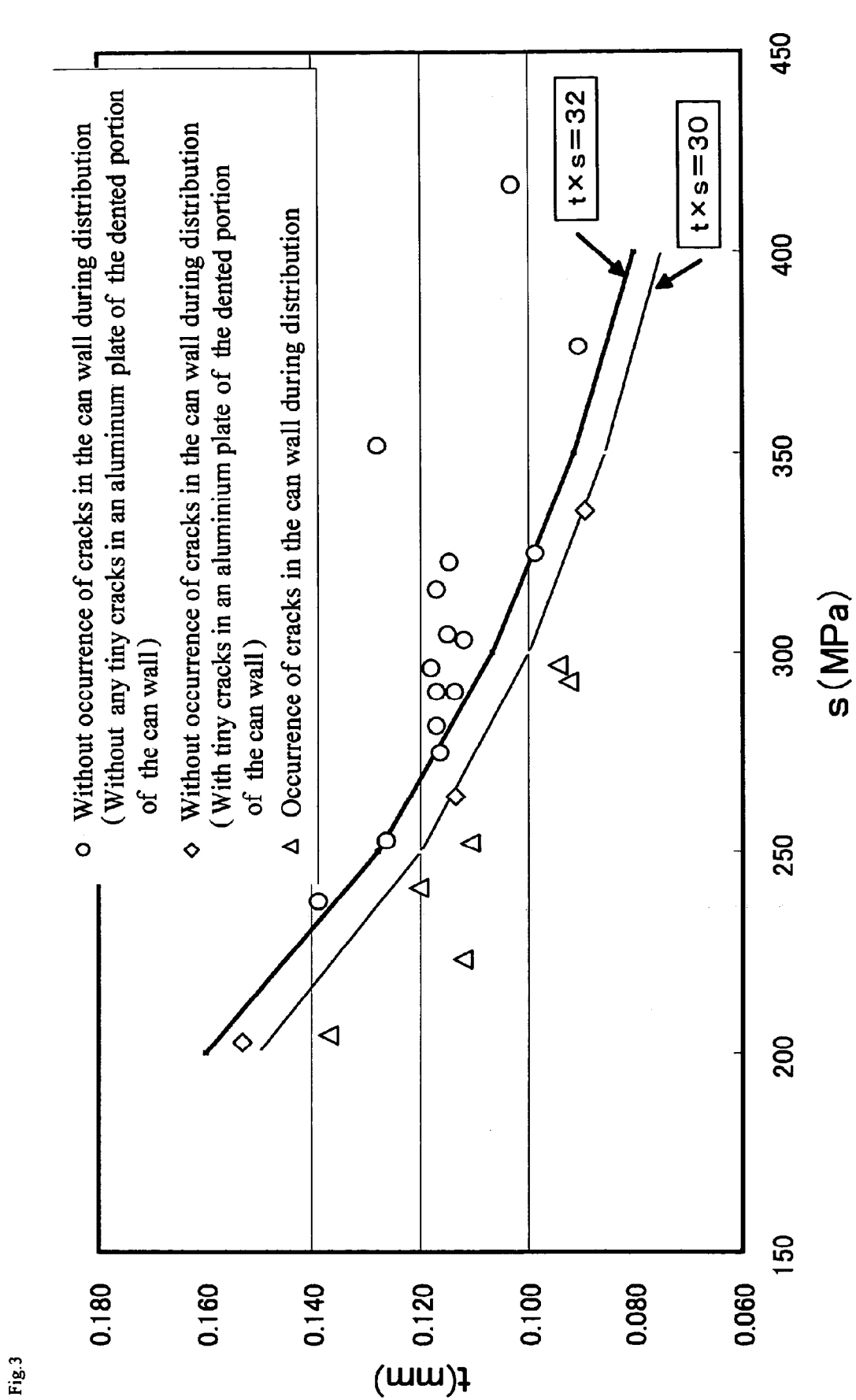
FIG. 3 is a general view illustrating the relationship of a resin-coated inner surface of aluminum seamless can of the present invention <t s>.

As showed in FIG. 3, in the can of the present invention, resistance against cracks in the can wall have an interrelationship in the product of the thickness of a plate of the can wall including a thermo-plastic resin layer of the can wall <t>, and the tensile stress of the can wall including a thermo-plastic resin layer <s>.

That is, cracks in the can wall can be prevented by improving resistance against cracks in the can wall during distribution by increasing <t s>. Referring to FIG. 3, it shows that the can in the scope of <t s>≧30 has superior resistance against cracks in the can wall, and the preferable scope is <t s>≧32.

<t s> can be increased in the following methods.

1. Improve the strength of the aluminum plate by changing the composition of the aluminum plate, that is, by increasing the amount of components of added elements such as Cu, Mn, and Mg.
2. Increase the strength of the aluminum plate by increasing the rate of cold rolling and increasing the quantity of hardening during working in the process of manufacturing an aluminum plate.
3. Decrease the elution of strength of an aluminum plate by recovery or re-crystallization, by decreasing both or either of quality of heat an aluminum that plate receives before it is formed and after it is formed.
4. Increase the strength of resin by drawing, stretching and ironing so as to produce oriented crystallized thermo-plastic resin.
5. Increase the quantity of hardening during working by increasing the rate of working of draw-ironing (the rate of reduction of the wall).

[Oriented Crystallization of Thermo-Plastic Resin]

In the present invention, it is important that the polyester resin laminated on the inner and/or outer surface of the can wall of the can be surface- or axis-oriented crystallized. By this oriented crystallization, the strength of polyester resin improves and resistance against cracks in the can wall during distribution increases.

Oriented crystallization of the thermo-plastic resin can be obtained by the forming of draw-ironing and/or stretch-drawing that is the means of forming the resin-coated aluminum plate of the can.

Further, when the resin film is coated on the inner and/or outer surface of the can after forming the aluminum can that has not been coated the thermo-plastic resin, it may be prepared in advance, the melt-extruded thermo-plastic resin film that is oriented crystallized which can be obtained by being biaxially oriented in the longitudinal direction and in the transverse direction.

[Production of Cans]

Next, the can as an embodiment of the present invention is produced by using a thermo-plastic resin-coated aluminum plate, punching this plate into a disk-shape to make a blank, and forming it into a cylindrical shape by draw-ironing or/and stretch-drawing. In that case, a decreased thickness of a plate in the side wall of the can could decrease the material and cost.

Firstly, the method of production of cans by stretch-drawing is described here. Stretch-drawing is a way of working that using a metal cup, a punch, a wrinkle block and a die, in producing relatively slim seamless cans, the wrinkle block is inserted in the metal cup. Then using the wrinkle block the bottom of the metal cup is pressed against the plate portion of the die, and with the punch being moved forward into a cavity of the die, the outer surface of the side wall of the metal cup is affixed to the plane portion of the die and the working corner where the radius of curvature of the die is small. Further, the thickness of a plate of the side wall decreases by bent-elongation at the working corner, then to decrease the thickness of a plate of the side wall more by cooperation with the inside of the cavity.

Further, the work of ironing can be added by clearance of the die and the punch in the work of stretch-drawing.

The formed cans in that way are performed trimming to even the height of the cans. Also in response to necessity, the cans are washed or heat-treated to remove lubrication in working.

Then, for printing on the outer surface, generally they are coated ink and finishing varnish, and to harden the ink and the finishing varnish they are dried. Then, by necking the diameter of the opening of the can wall the neck in portion 13 is obtained to have a predetermined diameter, and by flanging the flange portion 14 is formed to force a lid on the top of the can.

The way of producing cans by draw-ironing working will be described in the following.

[Cupping]

A drawn cup is formed at high-speed by applying lubricating agent onto the resin-coated aluminum plate, being punched by a cupping press, and drawing.

[Forming of Drawn-Ironed Cans]

After forming drawn cups as above mentioned, the working of decreasing the thickness of a plate of the can wall is provided.

The resin-coated aluminum drawn-ironed can 10, as an embodiment of the present invention, is produced by subjecting the above-mentioned aluminum plate to known means such as draw-ironing working (DI working) in a manner that the resin-coated surface 12 becomes the inner surface side of the can.

As the way of draw-ironing working (DI working), the resin-coated aluminum seamless can body 10 can be produced by ironing on one or several levels using an ironing punch.

The above-mentioned series of working process of forming cups from draw-ironing working to ironing working is desired to be conducted under the following conditions.

Diameter of blank: 70 to 300 mm
Drawing condition (drawing ratio): 1.1 to 3.0
Ratio of ironing: 50 to 85%

Referring to the ironing working, the thickness of a plate of the can desirably be decreased to accomplish a ratio of ironing as defined by the following formula, $$RI=\{(tB-tW)/tB\}\times 100$$

wherein tB is a thickness of the aluminum blank, and tW is a thickness of the aluminum plate of the side wall of the draw-ironing can.

In drawing forming and ironing forming, the aluminum plate or the resin-coated aluminum plate, or drawn cup can be formed by being applied onto various lubrication agents such as liquid paraffin, synthetic paraffin, edible oil, edible oil, hydrogenated edible oil, palm oil, various natural wax, polyethylene wax, synthetic ester and mineral oil.

The applied amount of lubrication materials may differ depending upon agents, however generally it is from 10 to 6000 mg/m$^2$ on the one side. The lubrication materials are applied onto the surface by being spayed or rolled at stages of melted, solution, or undiluted solutions.

Ironing forming is obtained by lubricating and cooling by applying coolant onto the drawn cup, and by re-drawing and ironing working on several levels. Further, when the both sides are coated with thermo-plastic resin, re-drawing and ironing working on several levels can be arranged.

After producing a resin-coated aluminum seamless can body as above-mentioned, cans are washed and dried and the outer surface of the can is subjected to the printing, applying finishing varnish, necking and flanging, thereby to obtain a can.

Further, there is a way of producing a can by using an aluminum plate that has not been coated with thermo-plastic resin, and after forming as a cylindrical shape and washing by the above-mentioned method, the thermo-plastic resin film being coated on the can that has been formed. By this after-coating method, the outer surface of the aluminum can that has been formed by using an aluminum blank, can be coated with a thermo-plastic resin film. Further, if the thermo-plastic resin film is printed, it can be used as print labels.

Furthermore, it is possible that the outer surface of the can that is formed using a thermo-plastic resin-coated aluminum plate is laminated with the thermo-plastic resin film. In this case, resistance against cracks in the can wall is even more improved.

EXAMPLES

The invention will now be described by way of Examples, however, it will be obvious that these descriptions in the following are provided for explanation for the Examples and that these descriptions are not intended to limit the scope of the invention in any sense.

[Method of Evaluation and Measurement]

The drawn cup that was formed by using an aluminum plate, whereof the one side of the surface is coated with a polyester resin, being punched by a cupping press, and being drawn, was worked by ironing under these following conditions, Diameter of a drawing punch: 65.8 mm ø

Total Ratio of Ironing: 62 to 64% (ironing on three levels), the draw-ironed aluminum can was produced, wherein the polyester resin is coated on the inner surface of the can. Using this draw-ironed can the following evaluations were conducted.

(1) Measurement of Puncture Strength for Side Wall of Can

Figure 4:
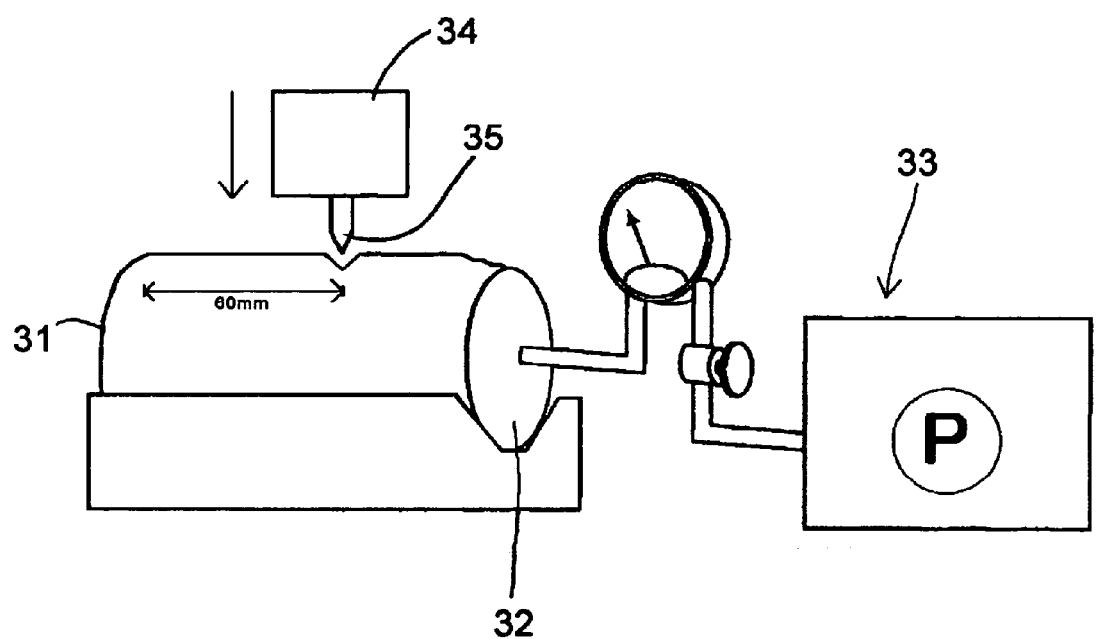
FIG. 4 is an explanatory diagram evaluating resistance against cracks in the can wall utilizing a method of measurement of puncture strength.

Because a strong interrelationship was found between the condition of incidence of cracks in the can wall during distribution and the puncture strength measured in the following method, resistance against cracks in the can wall were evaluated by using the method of measurement of puncture strength for the side wall of the can as below-described. After 350 ml or 500 ml water was filled in a sample can 31 having a capacity each of 350 ml or 500 ml mounted the lid, as shown in FIG. 4, the device that uses air to add internal pressure 33 was affixed to the opening of the can 32 and the same internal pressure with that of beer cans 190 kPa was added. A puncturing device 35 was mounted on a test machine for compression 34, the sample can 31 was set wherein the puncturing device 35 was put on the thinnest position of the thickness of a plate of the side wall of the can (in the Examples, it was 60 mm from the bottom of the can) in the direction of height of the can, and puncture strength for the side wall of the can was measured. The radiometer of the point of the puncturing device 35 was 2.25 mm and the descending speed of the puncturing device 35 was 200 mm/min.

The condition of incidence of cracks in the can wall at the level of 1 million cans during distribution and the puncture strength had the following relationship. The cans that had a puncturing strength of less than 88 N caused cracks in the can wall, and the cans that had a puncturing strength of not less than 88 N did not cause cracks in the can wall. However, even among the cans that had a puncturing strength of not less than 88 N, the cans had a puncturing strength of from 88 N to 92 N mm were found an existence of tiny cracks that can become an origin of cracks in the can wall in an aluminum plate of the dented portion of the can wall.

(2) Evaluation of Flange Cracking

For the cans of the Examples, beer was filled in 300 thousand cans and they were checked on leaking out caused by flange cracking and researched a rate of incidence of flange cracking during filling.

(3) Measurement of Tensile Stress for Side Wall of Can <s>

Figure 5:
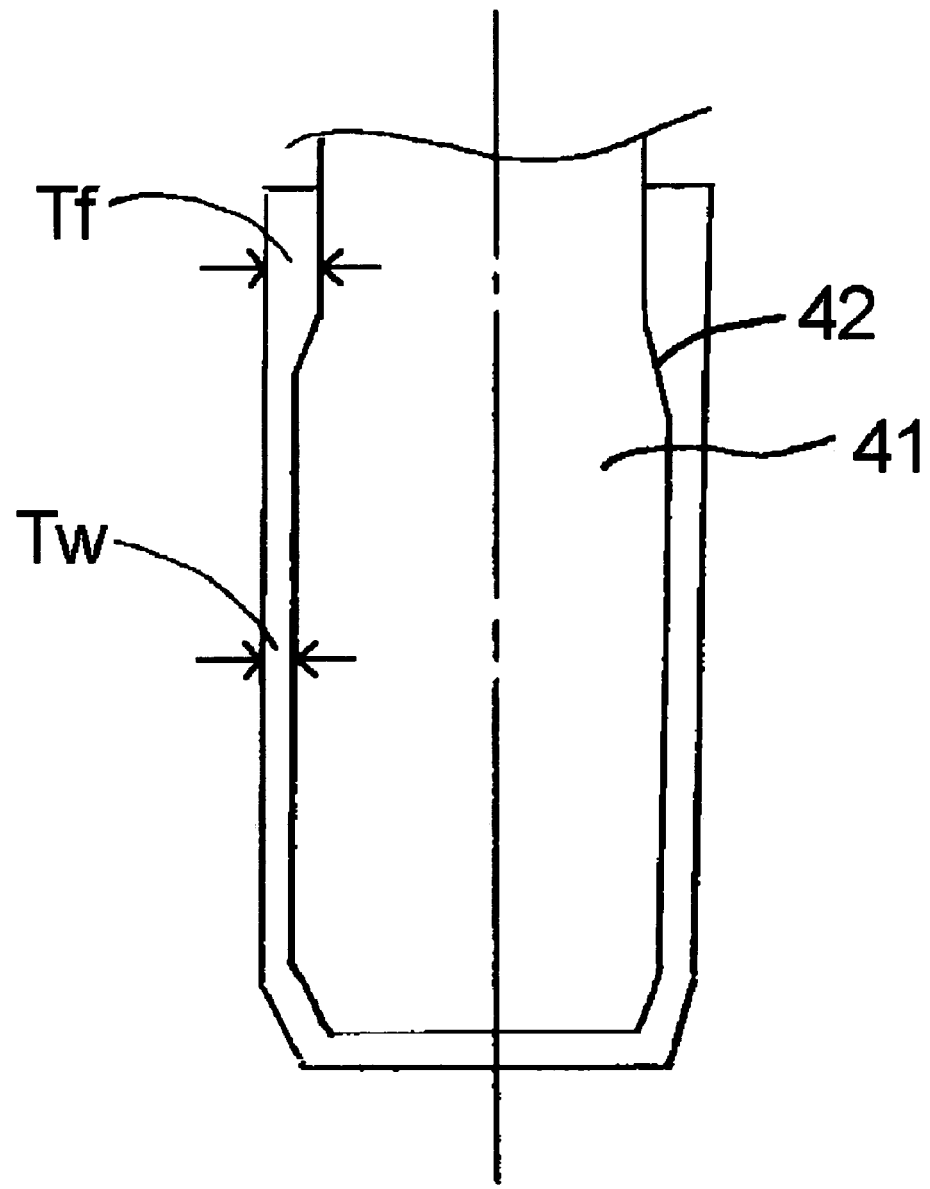
FIG. 5 is an illustrative diagram of the thickness of a plate in the neck in portion and the thickness of the plate in the side wall of the can.

To measure a tensile stress <s>, a tensile stress test specimen that has size of JIS No. 6 was used. Generally, the shape of the side wall of the can is, as shown in FIG. 5 provided a ramp 42 at a punch 41 in draw-ironing, the thickness of a plate in the neck in portion (Tf) is established as greater than the thickness of a plate of the side wall of the can (Tw). Therefore, most cracks in the can wall during distribution was caused at the side wall of the can that had the less thickness of the plate.

For that reason, the tensile stress test specimen to measure a tensile stress <s> was cut out at the position (in the Examples, it was 60 mm from the bottom of the can) that has the minimum thickness of a plate of the side wall of the can (Tw), in the direction of height of the can, with the direction of tensile being in the axial direction of the can (in the direction of height of the can). The thickness of a plate was measured by micrometer. The speed of tensile test was 1 mm/min.

(4) Measurement of Oriented Crystals of Polyester Resin Layer

Generally, the existential state of oriented crystals of resin film can be disclosed by measurement of X-ray diffraction. As for surface oriented crystals, the X-ray diffraction intensity of a (100) plane was measured, and as for one-axis oriented crystals the X-ray diffraction intensity of a (105) plane was measured.

In these Examples, the state of orientation of polyester crystals was measured by the measurement of X-ray diffraction of a (100) plane that is parallel to the surface of polyester resin, or by the measurement of X-ray diffraction of a (105) plane, where the axis C and the normal is leaned about 8° to 10°.

The axis C is in the direction of chain, and by the ironing forming of the can the axis C becomes parallel to the direction of height of the can and it is in about the same direction of the normal of the (105) plane (which is leaned about 8° to 10°), then measuring the existential situation of this (105) plane makes possible to know the direction of the axis C, that is the state of one-axis oriented crystals.

Further, as for the surface orientation, the (100) plane comprising benzene ring is parallel to the surface of resin film and measuring the existential situation of this (100) plane makes it possible to know the state of surface oriented crystals.

(a) Measurement of Surface Orientation

Referring to the can that has been coated with polyester resin, the thinnest position of the side wall of the can in the direction of height of the can (in the Examples, it was 60 mm from the bottom of the can) was cut out, and set in the device of X-ray diffraction by the reflection method, wherein the angle of incidence and the angle of reflection are symmetrical with respect to the normal of the surface of a film.

Next, the diffraction angle 2θ was scanned between 20 and 30° at the speed of 2°/min, and under the following conditions of X-ray diffraction, having the degree of diffraction as the horizontal axis and the X-ray diffraction intensity as the vertical axis, a curve of the X-ray diffraction intensity was obtained.

The X-ray diffraction conditions were described in the following.

The conditions were set in the following: target: Cu, voltage of vacuum tube: 30 kV, electric current of vacuum tube: 100 mA, divergence slit: 0.5, and receiving slit: 0.15 mm, then a curve of the X-ray diffraction intensity was obtained.

Figure 6:
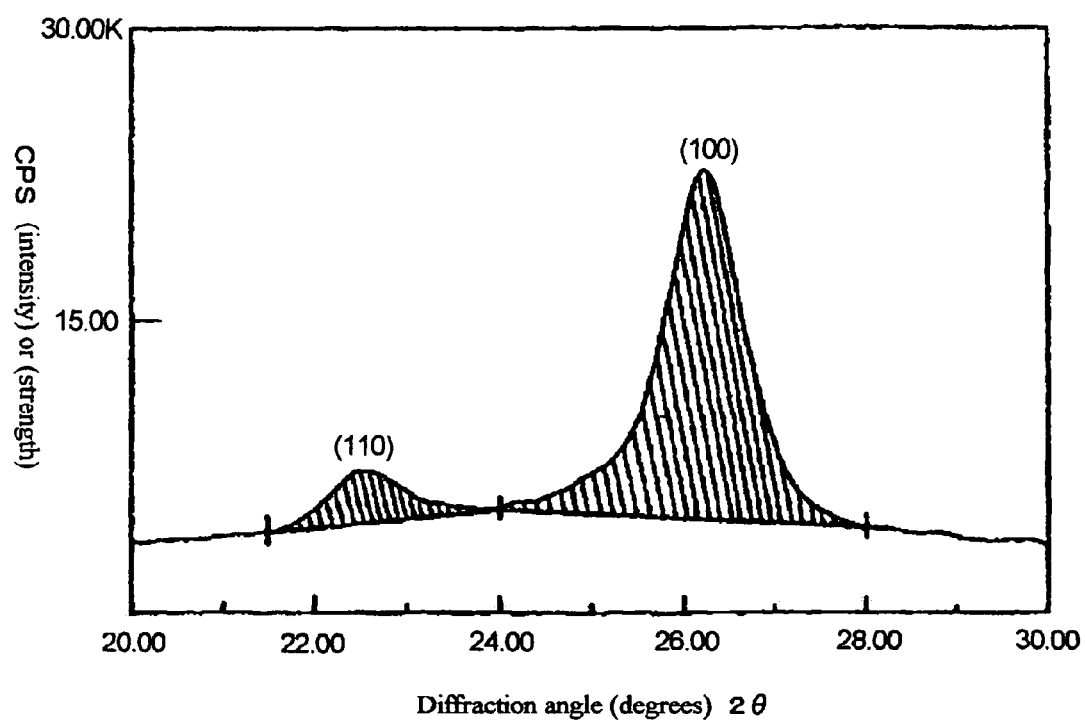
FIG. 6 is a curve of the X-ray diffraction intensity of (100) plane.

As shown in FIG. 6, the peak of diffraction of a (110) plane was found around 22.5 at the diffraction angle 2θ, and the peak of diffraction of a (100) plane was found around 26 at the diffraction angle 2θ.

If this amount of the peak intensity of a (100) plane/the peak intensity of a (110) plane that was obtained from the can that was coated with polyester resin is greater than the amount of the peak intensity of a (100) plane/the peak intensity of a (110) plane that was obtained from the same polyester resin which has spherulite structure that is not oriented, it can be concluded that the crystals of polyester resin is surface-oriented parallel to the film surface.

(b) Measurement of Axis Orientation

Referring to the can that has been coated with polyester resin, after the thinnest position of the side wall of the can in the direction of height of the can (in the Examples, it was 60 mm from the bottom of the can) was cut out, immersed in dilute hydrochloric acid to dissolve aluminum and isolated the polyester film, washed and dried, the polyester film was set in the X-ray diffraction device by the transmission method after being washed and dried.

At that time, with the state of 2θ=0 degrees, the polyester film was set as vertical to the X-ray incidence beam.

Next, the X-ray diffraction angle 2 was set as the diffraction angle of 42.9 of a (105) plane of a PET polyester resin.

The polyester resin film was turned on an axis of the membrane normal on the surface of X-ray diffraction measurement from 0 to 360 at the speed of 0.5 sec/min, and under the following conditions of X-ray diffraction, having the degree of diffraction as the horizontal axis and the X-ray diffraction intensity as the vertical axis, a curve of the (105) X-ray diffraction intensity was obtained.

Then the turn angle 0 and 180 was corresponded to the direction of the circumference of the can, 90 to the direction of bottom of the can and 270 to the direction of height of the can.

The X-ray diffraction conditions were described in the following and then a curve of the X-ray diffraction intensity was obtained to be a background.

Target: Cu, vacuum tube voltage: 40 kV, electric current of vacuum tube: 40 mA, divergence slit: 1, receiving slit: 0.3 mm, and the X-ray diffraction angle 2θ45.0.

Next, having a state of the X-ray diffraction angle 2θ42.9, a curve of the X-ray diffraction intensity of a (105) crystal plane of a PET polyester resin. By subtracting the curve of the X-ray diffraction intensity of 2θ45.0 from the curve of the X-ray diffraction intensity of 2θ42.9, a curve of the diffraction intensity of a (105) crystal plane can be obtained (refer to FIG. 7).

Figure 7:
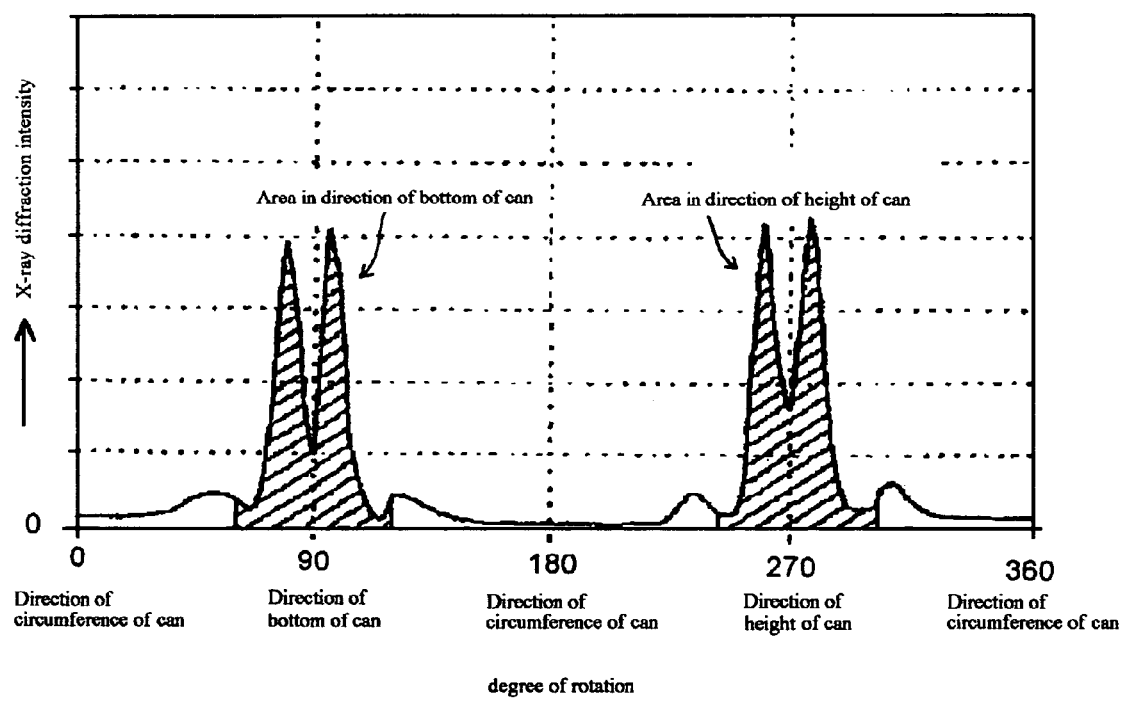
FIG. 7 is a curve of the X-ray diffraction intensity of (105) plane.

As shown in FIG. 7, if the peak in the diffraction intensity of the (105) plane is found, it shows that there exists oriented crystals, and particularly the peak is found at the turn angle of 90±4 30, and 270±30, it can be concluded that the crystals are axis-oriented in the direction of height of the can.

(5) Parameter H of Oriented Crystals

Referring to the diagram of the curve of the X-ray diffraction intensity in FIG. 7, when X and Y are defined as follows, X: the entire area of the diffraction intensity of a (105) crystal plane at the turn angle of from 0 to 360

Y: the total area of the partial area of the turn angle of 90±30 and the partial area of the turn angle of 270±30, A parameter H of oriented crystals is defined with the following formula, $$H=Y/X.$$

In the present invention, it is desired that the parameter H is not less than 0.5.

Figure 8:
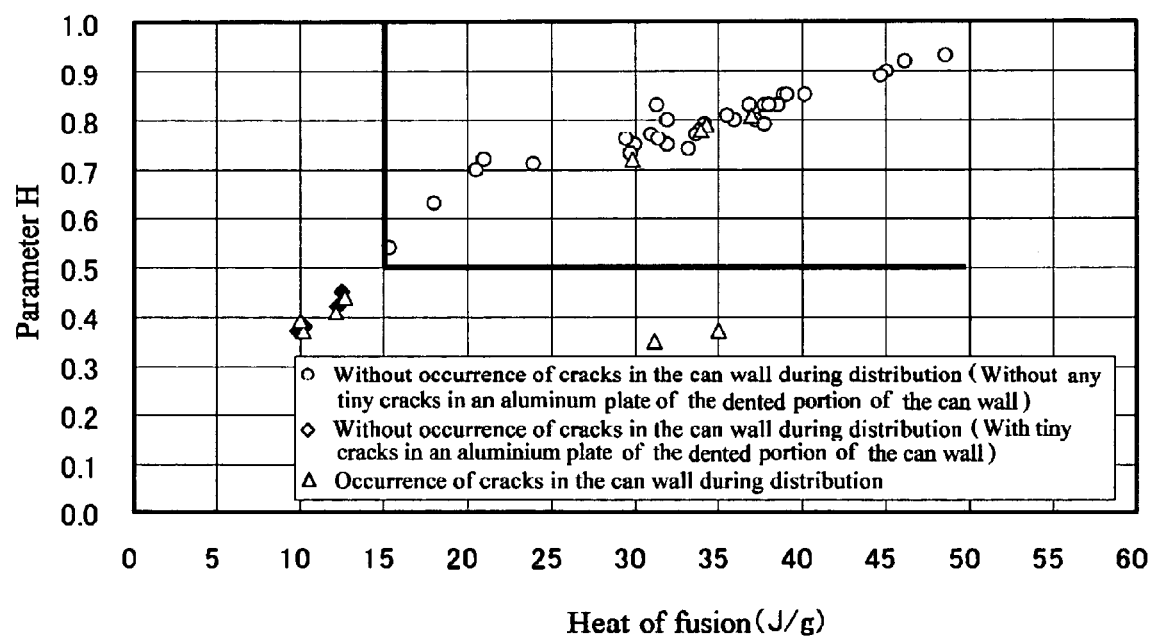
FIG. 8 is an explanatory diagram illustrating the relationship between the parameter H of oriented crystals, the heat of fusion, and resistance against cracks in the can wall.

As shown in FIG. 8, for the cans that are the aluminum cans coated with the polyester resin on the inner and/or outer surface of the can, and that prevent cracks in the can wall from occurring during distribution, wherein the polyester resin layer is comprised of oriented crystals, and the parameter H that represents the axial orientation degree of the oriented crystals of the polyester resin layer in the direction of height of the can is H≧0.5, and a heat of fusion (A) of the polyester resin layer is not less than 15 J/g, even if the cans are dented in the can wall, that do not cause any tiny cracks to become an origin of cracks in the can wall in an aluminum plate, and it is possible to provide a even more superior resin-coated aluminum seamless can body in a manner that it has resistance against cracks in the can wall during distribution.

Here, the heat of fusion represents the total degree of crystallization of resin and the parameter H represents the oriented resin in the axial direction of the can among the crystallized resin.

To have H≧0.5, in forming cans, it is needed to oriented crystallize the coating resin and it is useful to adapt the ironing and stretch-drawing to work.

(6) Measurement of Heat of Fusion (A)

Figure 9:
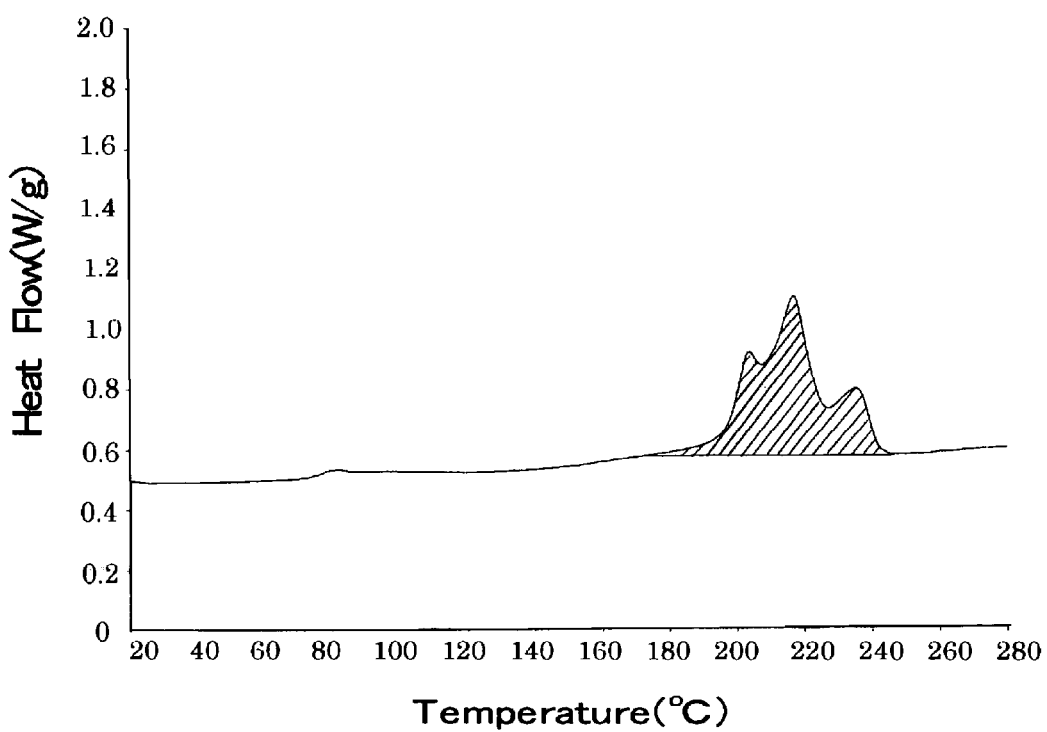
FIG. 9 is a result of the measurement of heat of fusion for the polyester film in the thinnest position of the can wall in the direction of height of the can.

As for the measurement of a heat of fusion (A) as shown in FIG. 8, referring to the can that has been coated with polyester resin, after the thinnest position of the can wall in the direction of height of the can (in the Examples, it was 60 mm from the bottom of the can) was cut out, immersed in dilute hydrochloric acid to dissolve aluminum and isolated the polyester film, washed and dried, the heat of fusion was measured by increasing temperature by Differential Scanning Calorimetry (DSC) at the speed of 20/min (refer to FIG. 9).

Example 1

As a substrate, an aluminum plate that had a thickness of a plate of 0.3 mm was used.

The composition of the substrate was, Mn: 1.1 weight percent, Mg: 1.1 weight percent. Cu: 0.19 weight percent, Si: 0.30 weight percent, Fe: 0.43 weight percent and the rest was Al.

On the surface of the substrate, phosphoric acid chrome acid treatment to have an amount of chrome of 20 mg/m² by metal chrome conversion was provided, and referring to the one side of the surface of this substrate, a copolymerized polyethylene telephthalate/isophthalate (PET/IA) non-oriented resin film (the thickness is 5 μm), containing isophthalic acid in an amount of 10 mol % as a copolymerized component is laminated on the inner surface of the can at a temperature of 250 to produce a thermoplastic resin-coated aluminum plate.

The thermo-plastic resin-coated aluminum plate that was obtained in a manner as mentioned above was punched into a disk-shape, and then by a known method, to have a thickness of a plate as shown in Table 1, draw-ironing was worked and the end of the opening was trimmed, washed and dried of the can, after the outer surface was subjected to printing, drying at 200, the neck in portion was formed, thereby to obtain a 350 ml thermoplastic resin-coated can.

Example 2

As a substrate, an aluminum plate that had a thickness of a plate of 0.28 mm was used.

On the surface of the substrate phosphoric acid chrome acid treatment to have an amount of chrome of 20 mg/m² by metal chrome conversion was provided, a copolymerized polyethylene telephthalate/isophthalate (PET/IA) resin film is laminated on the inner surface of the can to have a thickness of a film of 16 μm and on the outer surface of the can to have a thickness of a film of 16 μm.

Expect for the facts described above, under the same conditions of Example 1, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, draw-ironing was worked, and after the end of the opening was trimmed, heat-treated at 200, and after the outer surface was subjected to printing, and drying at 200, the neck in portion was formed, thereby to obtain a 350 ml thermo-plastic resin-coated can.

Example 3

As a substrate, an aluminum plate that had a thickness of a plate of 0.25 mm was used.

Referring to the surface of this substrate, a copolymerized polyethylene telephthalate/isophthalate (PET/IA) resin film is laminated on the inner surface of the can to have a thickness of a film of 40 μm and on the outer surface of the can to have a thickness of a film of 16 μm. Expect for the facts described above, under the same conditions of Example 2, a thermoplastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 4

As a substrate an aluminum plate was used. Referring to the surface of this substrate, a copolymerized polyethylene telephthalate/isophthalate (PET/IA) resin film is laminated on the inner surface of the can to have a thickness of a film of 32 μm and on the outer surface of the can to have a thickness of a film of 11 μm.

This copolymerized resin film contained isophthalic acid in an amount of 30 mol %. Expect for the facts mentioned above, under the same conditions of Example 3, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 5

As a substrate an aluminum plate that was composed of Mn: 0.4 weight percent, Mg: 4.6 weight percent. Cu: 0.04 weight percent, Si: 0.12 weight percent, Fe: 0.25 weight percent and Al for the rest, was used.

Referring to the surface of the substrate, a copolymerized polyethylene telephthalate/isophthalate (PET/IA) resin film is laminated on the inner surface of the can to have a thickness of a film of 32 μm and on the outer surface of the can to have a thickness of a film of 32 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, draw-ironing was worked and after trimming and heat-treatment at 200, and after the outer surface was subjected to printing, and drying at 200, the neck in portion was formed, thereby to obtain a 500ml thermo-plastic resin-coated aluminum can.

Example 6

As a substrate, an aluminum plate that had a thickness of a plate of 0.25 mm was used.

Referring to the surface of the substrate, a copolymerized polyethylene telephthalate/isophthalate (PET/IA) resin film is laminated on the inner surface of the can to have a thickness of a film of 16 μm and on the outer surface of the can to have a thickness of a film of 16 μm. Expect for the facts described above, under the same conditions of Example 5, a thermo-plastic resin-coated aluminum plate was produced. The thermo-plastic resin-coated aluminum plate that was obtained in a manner as mentioned above was punched into a disk-shape, and then to have a thickness of a plate as shown in Table 1, the can was produced under the same conditions of Example 2.

Example 7

As a substrate an aluminum plate was used.
Referring to the surface of the substrate, a copolymerized polyethylene telephthalate/isophthalate (PET/IA) resin film is laminated on the inner surface of the can to have a thickness of a film of 16 μm and on the outer surface of the can to have a thickness of a film of 32 μm.

This copolymerized resin film contained isophthalic acid in an amount of 30 mol %. Expect for the facts described above, under the same conditions of Example 6, a thermo-plastic resin-coated aluminum plate was produced.

The thermoplastic resin-coated aluminum plate that was obtained in a manner as mentioned above was punched into a disk-shape, and then to have a thickness of a plate as shown in Table 1, the can was produced under the same conditions of Example 2.

EXAMPLE 8

As a substrate, an aluminum plate that had a thickness of a plate of 0.25 mm was used.

As a substrate the aluminum plate that was composed of Mn: 0.5 weight percent, Mg: 5.0 weight percent. Cu: 0.05 weight percent, Si: 0.10 weight percent, Fe: 0.29 weight percent and Al for the rest, was used.

Referring to the surface of the substrate, a copolymerized polyethylene telephthalate/isophthalate (PET/IA) resin film is laminated on the inner surface of the can to have a thickness of a film of 16 μm and on the outer surface of the can to have a thickness of a film of 5 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 9

As a substrate, an aluminum plate that had a thickness of a plate of 0.28 mm was used.

As a substrate an aluminum plate that was composed of Mn: 1.1 weight percent, Mg: 1.1 weight percent. Cu: 0.19 weight percent, Si: 0.30 weight percent, Fe: 0.43 weight percent and Al for the rest, was used.

The aluminum plate was punched into a disk-shape, and then to have a thickness of a plate as shown in Table 1, draw-ironing was worked.

After trimming, washing and drying of the can, thermosetting coating being sprayed on the inner surface and dried at 200, the polyethylene film that has a thickness of a film of 50 μm, wherein an urethane adhesive agent was applied to the side of adhering to the can, was heat-attached by pressure to the outer surface of the can, and after the entire outer surface of the can was coated with polyethylene film, the neck in portion was formed, thereby to obtain a thermo-plastic resin-coated can.

Example 10

As a substrate, an aluminum plate was used.
On both surfaces of the substrate, the non-oriented resin film that had a thickness of a film of 5 μm was laminated.

A copolymerized PET/NDC resin was used, containing naphthalene dicarboxylic acid in an amount of 8 mol % as a copolymerized component.

Expect for the facts described above, under the same conditions of Example 2, a thermo-plastic resin-coated aluminum plate was produced.

The thermoplastic resin-coated aluminum plate that was obtained in a manner as mentioned above was punched into a disk-shape, and then to have a thickness of a plate as shown in Table 1, the can was produced under the same conditions of Example 2.

Example 11

As a substrate an aluminum plate was used.
On both surfaces of this substrate,
a two-layer copolymerized resin film was laminated, including a surface layer of non-oriented film, containing isophthalic acid in an amount of 5 mol % as a copolymerized component of polyethylene telephthalate and having a thickness of a film of 4 μm, and a lower layer containing isophthalic acid in an amount of 15 mol % as a copolymerized component of polyethylene telephthalate and having a thickness of a film of 12 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 12

As a substrate an aluminum plate was used.
On both surfaces of this substrate,
a two-layer copolymerized resin film was laminated, including a surface layer of an non-oriented film, containing isophthalic acid in an amount of 5 mol % as a copolymerized component of polyethylene telephthalate and having a thickness of a film of 12 μm, and a lower layer containing isophthalic acid in an amount of 15 mol % as a copolymerized component of polyethylene telephthalate and having a thickness of a film of 4 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 13

As a substrate an aluminum plate was used.
On the surface of this substrate to become the inner surface of the can, the following two-layer copolymerized resin film was laminated.

The surface layer of an non-oriented film contained naphthalene dicarboxylic acid in an amount of 3 mol % as a copolymerized component of polyethylene telephthalate and had a thickness of a film of 5 μm.

The lower layer of an non-oriented film contained naphthalene dicarboxylic acid in an amount of 8 mol % as a copolymerized component of polyethylene telephthalate and had a thickness of a film of 5 μm.

Further, on the surface of this substrate to become the outer surface of the can, the following two-layer copolymerized resin film was laminated.

The surface layer of an non-oriented film contained naphthalene dicarboxylic acid in an amount of 5 mol % as a copolymerized component of polyethylene telephthalate and had a thickness of a film of 5 μm.

The lower layer of an non-oriented film contained naphthalene dicarboxylic acid in an amount of 10 mol % as a copolymerized component of polyethylene telephthalate and had a thickness of a film of 5 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 14

As a substrate an aluminum plate was used.
On both surfaces of this substrate, the following three-layer copolymerized white resin film was laminated.

The surface layer of an non-oriented film contained isophthalic acid in an amount of 5 mol % as a copolymerized component of polyethylene telephthalate and had a thickness of a film of 5 μm.

The middle layer of an non-oriented film was a copolymerized resin that contained isophthalic acid in an amount of 5 mol %, and that was comprised of titanium dioxide in an amount of 30 weight percent to have a thickness of a film of 20 μm.

The lower layer of an non-oriented film was a copolymerized resin that contained isophthalic acid in an amount of 15 mol %, and that was comprised of titanium dioxide in an amount of 5 weight percent to have a thickness of a film of 5 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 15

As a substrate an aluminum plate was used.
On the surface of this substrate to become the inner surface of the can, the following two-layer copolymerized resin film was laminated.

The surface layer of an non-oriented film contained naphthalene dicarboxylic acid in an amount of 3 mol % as a copolymerized component of polyethylene telephthalate and had a thickness of a film of 20 μm.

The lower layer of an non-oriented film contained isophthalic acid in an amount of 12 mol % as a copolymerized component of polyethylene telephthalate and had a thickness of a film of 30 μm.

Further, on the surface of this substrate to become the outer surface of the can, the following two-layer copolymerized resin film was laminated.

The surface layer of an non-oriented film contained isophthalic acid in an amount of 5 mol % as a copolymerized component of polyethylene telephthalate and had a thickness of a film of 15 μm.

The lower layer of an non-oriented film contained naphthalene dicarboxylic acid in an amount of 10 mol % as a copolymerized component of polyethylene telephthalate and had a thickness of a film of 25 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 16

As a substrate an aluminum plate was used.

On the surface of this substrate to become the inner surface of the can, the following three-layer copolymerized resin film was laminated.

The surface layer of an non-oriented film had a thickness of a film of 3 μm and was a copolymerized resin containing isophthalic acid in an amount of 5 mol %.

The middle layer had a thickness of a film of 8 μm, and was a copolymerized resin that contained isophthalic acid in an amount of 5 mol %, and that was comprised of ionomer resin in an amount of 18 weight percent and tocopherol in an amount of 0.5 weight percent.

The lower layer had a thickness of a film of 5 μm, and was a copolymerized resin that contained isophthalic acid in an amount of 15 mol %, and that was comprised of ionomer resin in an amount of 18 weight percent and tocopherol in an amount of 1 weight percent.

On the surface of this substrate to become the outer surface of the can, the following copolymerized resin film was laminated.

The non-oriented film contained isophthalic acid in an amount of 10 mol % as a copolymerized component of polyethylene telephthalate and had a thickness of a film of 16 μm.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 17

As a substrate an aluminum plate was used.

On the surface of this substrate to become the inner surface of the can, the following two-layer copolymerized resin film was laminated.

The surface layer of an non-oriented film had a thickness of a film of 4 μm and was a copolymerized resin containing isophthalic acid in an amount of 5 mol %.

The lower layer had a thickness of a film of 8 μm, and was a copolymerized resin that contained isophthalic acid in an amount of 15 mol %, and that was comprised PBT resin in an amount of 34 weight percent and olefin in an amount of 15 weight percent.

On the surface of this substrate to become the outer surface of the can, the following two-layer copolymerized resin film was laminated.

The surface layer of an non-oriented film contained isophthalic acid in an amount of 5 mol % as a copolymerized component of polyethylene telephthalate and had a thickness of a film of 3 μm.

The lower layer of an non-oriented film contained isophthalic acid in an amount of 15 mol % as a copolymerized component of polyethylene telephthalate and had a thickness of a film of 5 μm.

Expect for the facts described above, under the same conditions of Example 2, a thermoplastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 18

As a substrate an aluminum plate was used.

On the surface of this substrate to become the inner surface of the can, the following copolymerized resin film was laminated.

The film for the inner surface of the can had a thickness of a film of 16 μm and was a biaxially oriented copolymerized resin film that contained isophthalic acid in an amount of 5 mol %, and that was comprised of PBT resin in an amount of 30 weight percent.

On the surface of this substrate to become the outer surface of the can, the following copolymerized resin film was laminated.

The film for the outer surface of the can had a thickness of a film of 16 μm and was a biaxially oriented copolymerized resin film containing isophthalic acid in an amount of 12 mol %.

The temperature of the metal plate when of being laminated was 280.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 19

As a substrate an aluminum plate was used.

On both surfaces of this substrate the following copolymerized resin film was laminated. That is, the film had a thickness of a film of 16 μm and was a biaxially oriented copolymerized resin containing isophthalic acid in an amount of 12 mol %.

The temperature of the metal plate when of being laminated was 270.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

Example 20

As a substrate an aluminum plate was used.

On both surfaces of this substrate the following copolymerized resin film was laminated.

The film had a thickness of a film of 13 μm and was a biaxially oriented copolymerized resin that contained isophthalic acid in an amount of 12 mol %, and that was comprised of titanium dioxide in an amount of 20 weight percent.

The temperature of the metal plate when of being laminated was 270.

Expect for the facts described above, under the same conditions of Example 2, a thermo-plastic resin-coated aluminum plate was produced.

The thermo-plastic resin-coated aluminum plate that was obtained in a manner as mentioned above was punched into a disk-shape, and then to have a thickness of a plate as shown in Table 1, the can was produced under the same conditions of Example 2.

[Results]

Referring to the cans of Examples 1 to 20 that were produced as mentioned above, measurement of a thickness of an aluminum plate of the side wall of the can, measurement of a tensile stress at break for the aluminum plate of the side wall of the can in the direction of the circumference of the can (an aluminum tensile stress of the side wall of the can in the direction of the circumference of the can), measurement of a thickness of a plate of the side wall of the can (including thermo-plastic resin) t, measurement of a tensile stress for the side wall of the can in the direction of height of the can (including thermo-plastic resin) s, measurement of oriented crystals for the thermo-plastic resin layer, measurement of the parameter H, the heat of fusion, and the puncture strength of the can, and evaluation of the rate of incidence of flange cracking while the cans are being filled with the contents was conducted. The results are described in Table 1 to Table 3.

Comparative Example 1

An aluminum plate that was composed of Mn: 0.8 weight percent, Mg: 0.8 weight percent. Cu: 0.19 weight percent, Si: 0.29 weight percent, Fe: 0.50 weight percent and Al for the rest, was used.

A copolymerized polyethylene telephthalate/isophthalate (PET/IA) resin film that was laminated on the inner surface of the can had a thickness of a film of 5 μm, and the film that was laminated on the outer surface of the can had a thickness of a film of 16 μm.

Expect for the facts described above, under the same conditions of Example 2, a plate was produced. To have a thickness of a film of a plate as shown in Table 1, the can was produced under the same conditions of Example 2.

Comparative Example 2

An aluminum plate that has a thickness of a plate of 0.25 mm was used. A copolymerized polyethylene telephthalate/isophthalate (PET/IA) resin film that was laminated on the inner surface of the can had a thickness of a film of 32 μm, and the film that was laminated on the outer surface of the can had a thickness of a film of 16 μm.

Expect for the facts described above, under the same conditions of Comparative Example 1, a plate was produced.

As for this plate, to have a thickness of a plate as shown in Table 1, the can was produced under the same conditions of Example 2.

Comparative Example 3

A copolymerized polyethylene telephthalate/isophthalate (PET/IA) resin film that was laminated on the inner surface of the can had a thickness of a film of 16 μm, and the film that was laminated on the outer surface of the can had a thickness of a film of 5 μm.

Expect for the facts described above, under the same conditions of Example 4, a plate was produced. As for this plate, to have a thickness of a plate as shown in Table 1, the can was produced under the same conditions of Example 2.

Comparative Example 4

An aluminum plate that had a thickness of a plate of 0.28 mm was used. The composition of the aluminum plate was, Mn: 1.1 weight percent, Mg: 1.1 weight percent. Cu: 0.19 weight percent, Si: 0.30 weight percent, Fe: 0.43 weight percent and the rest was Al.

A disk-shape was punched from the aluminum plate mentioned above, and then to have a thickness of a plate as shown in Table 1, draw-ironing was worked. After trimming and washing and drying of the can, printing on the outer surface, thermosetting coating being sprayed on the inner surface, and being dried at 200, the neck in portion was formed and the can was obtained.

Comparative Example 5

An aluminum plate that had a thickness of a plate of 0.25 mm was used. Expect for the facts described above, under the same conditions of Example 9, a plate was produced. As for this plate, to have a thickness of a plate as shown in Table 1, draw-ironing was worked. After trimming, washing and drying of the can, thermosetting coating being sprayed on the inner surface, and dried at 200, the polyethylene film that had a thickness of a film of 50 μm, wherein an urethane adhesive agent was applied to the side of adhering to the can, was heat-attached by pressure to the outer surface of the can, and after the entire outer surface of the can was coated with polyethylene film, the neck in portion was formed, thereby to obtain a thermo-plastic resin-coated can.

Comparative Example 6

An aluminum plate that was composed of Mn: 0.5 weight percent, Mg: 5.3 weight percent. Cu: 0.10 weight percent, Si: 0.15 weight percent, Fe: 0.33 weight percent and Al for the rest, was used.

Expect for the facts described above, under the same conditions of Example 2, a plate was produced. As for this plate, to have a thickness of a plate as shown in Table 1, the can was produced under the same conditions of Example 2.

Comparative Example 7

A copolymerized polyethylene telephthalate/isophthalate (PET/IA) resin film contained isophthalic acid in an amount of 30 mol % and had a thickness of a film of 10 m of the surface for the inner surface of the can and had a thickness of a film of 8 μm of the surface for the outer surface of the can.

Expect for the facts described above, under the same conditions of Example 3, a plate was produced. To have a thickness of a plate as shown in Table 1, the can was produced under the same conditions of Example 2.

Comparative Example 8

Under the same conditions of Example 11, a plate was produced and a disk-shape was punched from this plate, and then to have a thickness of a plate as shown in Table 1, draw-ironing was worked under the same conditions of Example 2. After the end of the opening being trimmed and heat-treated at 250, the resin coating was amorphized. After the outer surface being subjected to printing, drying at 200, the neck in portion was formed, thereby to obtain a 350ml thermo-plastic resin-coated can.

[Results]

Referring to the cans of Comparative Examples 1 to 8 that were produced as mentioned above, measurement of a thickness of an aluminum plate of the side wall of the can, measurement of a tensile stress at break for the aluminum plate of the side wall of the can in the direction of the circumference of the can (an aluminum tensile stress of the side wall of the can in the direction of the circumference of the can), measurement of a thickness of a plate of the side wall of the can (including thermo-plastic resin) <t>, measurement of a tensile stress for the side wall of the can in the direction of height of the can (including thermo-plastic resin) <s>, measurement of oriented crystals for the thermo-plastic resin layer, and evaluation of the rate of incidence of flange cracking while the cans are being filled with the contents was conducted. The results are described in Table 1 to Table 3.

TABLE 1

|  | Capacity of cans | Thickness of aluminum plate of side wall of can (mm) | Aluminum tensile stress (at break) of side wall of can in direction of circumference of can (MPa) | Thickness of plate of side wall of can (including thermo-plastic organic resin) t (mm) | Tensile stress measured for side wall of can (including thermo-plastic organic resin) S (MPa) | t × S |
|---|---|---|---|---|---|---|
| Ex. 1 | 350 ml | 0.110 | 301 | 0.112 | 304 | 34 |
| Ex. 2 | 350 ml | 0.105 | 310 | 0.117 | 282 | 33 |
| Ex. 3 | 350 ml | 0.095 | 315 | 0.116 | 275 | 32 |
| Ex. 4 | 350 ml | 0.097 | 314 | 0.114 | 264 | 30 |
| Ex. 5 | 500 ml | 0.104 | 410 | 0.128 | 352 | 45 |
| Ex. 6 | 350 ml | 0.080 | 410 | 0.090 | 377 | 34 |
| Ex. 7 | 350 ml | 0.075 | 407 | 0.089 | 336 | 30 |
| Ex. 8 | 350 ml | 0.095 | 448 | 0.103 | 417 | 43 |
| Ex. 9 | 350 ml | 0.103 | 309 | 0.153 | 203 | 31 |
| Ex. 10 | 350 ml | 0.095 | 310 | 0.098 | 325 | 32 |
| Ex. 11 | 350 ml | 0.105 | 313 | 0.117 | 282 | 33 |
| Ex. 12 | 350 ml | 0.106 | 313 | 0.118 | 296 | 35 |
| Ex. 13 | 350 ml | 0.107 | 308 | 0.115 | 323 | 37 |
| Ex. 14 | 350 ml | 0.104 | 309 | 0.126 | 253 | 32 |
| Ex. 15 | 350 ml | 0.105 | 307 | 0.139 | 238 | 33 |
| Ex. 16 | 350 ml | 0.105 | 312 | 0.117 | 291 | 34 |
| Ex. 17 | 350 ml | 0.106 | 311 | 0.114 | 291 | 33 |
| Ex. 18 | 350 ml | 0.106 | 310 | 0.118 | 296 | 35 |
| Ex. 19 | 350 ml | 0.105 | 308 | 0.117 | 316 | 37 |
| Ex. 20 | 350 ml | 0.105 | 310 | 0.115 | 305 | 35 |
| Comp. Ex. 1 | 350 ml | 0.103 | 270 | 0.111 | 253 | 28 |
| Comp. Ex. 2 | 350 ml | 0.094 | 267 | 0.112 | 223 | 25 |
| Comp. Ex. 3 | 350 ml | 0.085 | 326 | 0.092 | 293 | 27 |
| Comp. Ex. 4 | 350 ml | 0.103 | 318 | 0.103 | 318 | 33 |
| Comp. Ex. 5 | 350 ml | 0.087 | 320 | 0.137 | 204 | 28 |
| Comp. Ex. 6 | 350 ml | 0.104 | 465 | 0.116 | 425 | 49 |
| Comp. Ex. 7 | 350 ml | 0.088 | 314 | 0.094 | 297 | 28 |
| Comp. Ex. 8 | 350 ml | 0.108 | 280 | 0.120 | 241 | 29 |

TABLE 2

|  | Types of thermo-plastic organic resin: types of firm | | Thickness of resin film of side wall of can (μm) | | | Oriented crystals of polyester resin |
|---|---|---|---|---|---|---|
|  | inner surface | outer surface | total | inner surface | outer surface | |
| Ex. 1 | copolymerized PET/IA - non-oriented film | — | 2 | 2 | — | oriented |
| Ex. 2 | copolymerized PET/IA - non-oriented film | copolymerized PET/IA - non-oriented film | 12 | 6 | 6 | oriented |
| Ex. 3 | copolymerized PET/IA - non-oriented film | copolymerized PET/IA - non-oriented film | 21 | 15 | 6 | oriented |
| Ex. 4 | copolymerized PET/IA - non-oriented film | copolymerized PET/IA - non-oriented film | 17 | 12 | 4 | unoriented |
| Ex. 5 | copolymerized PET/IA - non-oriented film | copolymerized PET/IA - non-oriented film | 24 | 12 | 12 | oriented |
| Ex. 6 | copolymerized PET/IA - non-oriented film | copolymerized PET/IA - non-oriented film | 10 | 5 | 5 | oriented |
| Ex. 7 | copolymerized PET/IA - non-oriented film | copolymerized PET/IA - non-oriented film | 14 | 5 | 10 | unoriented |
| Ex. 8 | copolymerized PET/IA - non-oriented film | copolymerized PET/IA - non-oriented film | 8 | 6 | 2 | oriented |
| Ex. 9 | — | polyethylenefilm | 50 | — | 50 | — |
| Ex. 10 | copolymerized PET/NDC - non-oriented film | copolymerized PET/NDC - non-oriented film | 3 | 2 | 2 | oriented |
| Ex. 11 | copolymerized PET/IA - two-layer non-oriented film | copolymerized PET/IA - two-layer non-oriented film | 12 | 6 | 6 | oriented |
| Ex. 12 | copolymerized PET/IA - two-layer non-oriented film | copolymerized PET/IA - two-layer non-oriented film | 12 | 6 | 6 | oriented |
| Ex. 13 | copolymerized PET/NDC - two-layer non-oriented film | copolymerized PET/NDC - two-layer non-oriented film | 8 | 4 | 4 | oriented |

TABLE 2-continued

| | Types of thermo-plastic organic resin: types of firm | | Thickness of resin film of side wall of can (μm) | | | Oriented crystals of polyester resin |
|---|---|---|---|---|---|---|
| | inner surface | outer surface | total | inner surface | outer surface | |
| Ex. 14 | copolymerized PET/IA - three-layer non-oriented white film | copolymerized PET/IA - three-layer non-oriented white film | 22 | 11 | 11 | oriented |
| Ex. 15 | copolymerized PET/NDC, PET/IA - two-layer non-oriented film | copolymerized PET/IA, PET/NDC - two-layer non-oriented film | 34 | 19 | 15 | oriented |
| Ex. 16 | copolymerized PET/IA ionomer blended - three-layer non-oriented film | copolymerized PET/IA - non-oriented film | 12 | 6 | 6 | oriented |
| Ex. 17 | copolymerized PET/IA, olefine, PBT blended - two-layer non-oriented film | copolymerized PET/IA - two-layer non-oriented film | 8 | 5 | 3 | oriented |
| Ex. 18 | copolymerized PET/IA, PBT blended - oriented film | copolymerized PET/IA - oriented film | 12 | 6 | 6 | oriented |
| Ex. 19 | copolymerized PET/IA - oriented film | copolymerized PET/IA - oriented film | 12 | 6 | 6 | oriented |
| Ex. 20 | copolymerized PET/IA - oriented white film | copolymerized PET/IA - oriented white film | 10 | 5 | 5 | oriented |
| Comp. Ex. 1 | copolymerized PET/IA - non-oriented film | copolymerized PET/IA - non-oriented film | 8 | 2 | 6 | oriented |
| Comp. Ex. 2 | copolymerized PET/IA - non-oriented film | copolymerized PET/IA - non-oriented film | 18 | 12 | 6 | oriented |
| Comp. Ex. 3 | copolymerized PET/IA - non-oriented film | copolymerized PET/IA - non-oriented film | 7 | 5 | 2 | unoriented |
| Comp. Ex. 4 | — | — | 0 | — | — | — |
| Comp. Ex. 5 | — | polyethylenefilm | 50 | — | 50 | — |
| Comp. Ex. 6 | copolymerized PET/IA - non-oriented film | copolymerized PET/IA - non-oriented film | 12 | 6 | 6 | oriented |
| Comp. Ex. 7 | copolymerized PET/IA - non-oriented film | copolymerized PET/IA - non-oriented film | 6 | 4 | 3 | unoriented |
| Comp. Ex. 8 | copolymerized PET/IA - two-layer non-oriented film | copolymerized PET/IA - two-layer non-oriented film | 12 | 6 | 6 | unoriented |

TABLE 3

| | Parameter H | | Heat of fusion (A) (J/g) | | Puncture strength of can wall (N) | Rate of incidence of flange cracking during filling (ppm) |
|---|---|---|---|---|---|---|
| | inner surface | outer surface | inner surface | outer surface | | |
| Ex. 1 | 0.85 | — | 38.9 | — | 102 | 0 |
| Ex. 2 | 0.82 | 0.77 | 37.1 | 33.7 | 98 | 0 |
| Ex. 3 | 0.83 | 0.75 | 38.6 | 32.0 | 92 | 0 |
| Ex. 4 | 0.45 | 0.37 | 12.5 | 9.8 | 88 | 0 |
| Ex. 5 | 0.79 | 0.73 | 34.2 | 29.7 | 128 | 0 |
| Ex. 6 | 0.83 | 0.77 | 36.9 | 31.0 | 98 | 0 |
| Ex. 7 | 0.42 | 0.38 | 12.2 | 10.3 | 89 | 0 |
| Ex. 8 | 0.78 | 0.74 | 33.9 | 33.2 | 123 | 0 |
| Ex. 9 | — | — | — | — | 90 | 0 |
| Ex. 10 | 0.83 | 0.76 | 37.8 | 29.5 | 100 | 0 |
| Ex. 11 | 0.75 | 0.72 | 30.0 | 21.0 | 97 | 0 |
| Ex. 12 | 0.85 | 0.80 | 39.1 | 36.0 | 104 | 0 |
| Ex. 13 | 0.92 | 0.83 | 46.2 | 38.0 | 108 | 0 |
| Ex. 14 | 0.63 | 0.54 | 18.0 | 15.4 | 92 | 0 |
| Ex. 15 | 0.80 | 0.76 | 37.2 | 31.4 | 97 | 0 |
| Ex. 16 | 0.80 | 0.81 | 32.0 | 35.5 | 98 | 0 |
| Ex. 17 | 0.71 | 0.70 | 23.9 | 20.5 | 96 | 0 |
| Ex. 18 | 0.83 | 0.90 | 31.3 | 45.1 | 105 | 0 |
| Ex. 19 | 0.93 | 0.89 | 48.6 | 44.7 | 109 | 0 |
| Ex. 20 | 0.85 | 0.79 | 40.2 | 37.8 | 100 | 0 |
| Comp. Ex. 1 | 0.81 | 0.78 | 37.0 | 33.9 | 82 | 0 |
| Comp. Ex. 2 | 0.79 | 0.72 | 34.3 | 29.8 | 75 | 0 |
| Comp. Ex. 3 | 0.41 | 0.37 | 12.1 | 10.2 | 81 | 0 |
| Comp. Ex. 4 | — | — | — | — | 77 | 0 |
| Comp. Ex. 5 | — | — | — | — | 82 | 0 |
| Comp. Ex. 6 | 0.80 | 0.75 | 37.2 | 33.6 | 138 | 10 |
| Comp. Ex. 7 | 0.44 | 0.39 | 12.7 | 10.0 | 84 | 0 |
| Comp. Ex. 8 | 0.37 | 0.35 | 35.0 | 31.2 | 84 | 0 |

[Evaluation Results]

(1) The cans of Examples 1 to 20 of the present invention satisfied all of the required conditions, namely that the cans had superior resistance against cracks in the wall during distribution and resistance against flange cracking, and had the puncture strength of not less than 88 N that was obtained from measurement of puncture strength for the side wall of the can, and cracks in the can wall did not occur during distribution (the cans exhibit superior resistance against cracks in the can wall).

(2) The cans of Examples 4 and 7, had values of the parameter H of less than 0.5 and the value of the heat of fusion of less than 15 J/g respectively, the polyester resin was not oriented crystallized. The cans had the puncture strength of 88

N and 89 N respectively, and cracks in the can wall did not occur during distribution, however there were found cans that had tiny cracks in the aluminum plate of the dented portion of the can wall.

On the other hand, the cans of Examples 1 to 3, 5, 6, 8, and 10 to 20 were the cans that had the polyester resin oriented crystallized and had the puncture strength of not less than 92 N, and even the cans that were dented in the can wall during distribution were not found any cracks in the aluminum plate of the dented portion, which indicates that the cans exhibit superior resistance against cracks in the can wall.

(3) The cans of Example 9 were the cans wherein the thermo-plastic resin film was coated on the outer surface of the can wall after forming and the value of <t×s> is 31, however these cans had the puncture strength of 90 N and cracks in the can wall did not occur during distribution, which indicates that even the cans that have the thermo-plastic resin film coated after forming, the cans exhibit superior resistance against cracks in the can wall.

(4) The cans of Comparative Examples 1 to 3, 5, 7 and 8, were out of the condition of <t s>≧30 as one of the required conditions of the present invention, the cans had the puncture strength of from 75 N to 84 N and the resistance against cracks in the can wall during distribution was inferior.

(5) The cans of Comparative Example 4 satisfied the condition of <t s>≧30 as one of the required conditions of the present invention, however there was no thermo-plastic resin in any surface of the can and the cans had the puncture strength of 77 N and the resistance against cracks in the can wall during distribution was inferior.

(6) The cans of Comparative Example 6 were over the condition of having a tensile stress for the aluminum plate of the side wall of the can in the direction of the circumference of the can of 450 MPa or less as one of required conditions of the present invention, therefore, even though the cans had the large puncture strength of 138 N, flange cracking during filling was occurred at the rate of 10 ppm.

As described above, according to the present invention, it is possible to produce a can that has a higher puncture strength than the conventional with less cost, even if the thickness of a plate of side wall of the cylindrical can is as thin as that or thinner than that of the conventional cans, and therefore this can offers the high utility value in industry.

Further, since the tensile stress at break measured for the aluminum plate of the side wall of the can as a substrate of the can in the direction of the circumference of the can, is regulated as 450 MPa or less, a can is provided stably in industry, which prevents flange cracking and leaking from occurring while the cans are being filled.

Moreover, as for beverage cans using the can of the present invention, because a can enables to decrease its weight and it offers the merit to the distribution industry of beverage cans.

What is claimed is:

1. A resin-coated aluminum seamless can body formed by draw-ironing and/or stretch-drawing, featuring superior resistance against cracks in the can wall during distribution and resistance against flange cracking,
   wherein the inner and/or outer surface of the can is coated with a thermo-plastic resin layer,
   the total thickness of the thermo-plastic resin layer of the inner surface and the outer surface is of 2-50 μm,
   with a minimum thickness of the aluminum plate of the side wall of the can 0.110 mm or less, and
   the tensile stress at break measured for the aluminum plate that is removed from thermo-plastic resin of the side wall of the can in the direction of the circumference of the can is 450 MPa or less, and
   the product of the minimum thickness of a plate of the side wall of the can including the thermo-plastic resin <t> (mm),
   and the tensile stress measured for the side wall of the can including the thermo-plastic resin in the direction of height of the can <s> (MPa) is <t×s>≧30;
   and said thermo-plastic resin layer is a thermo-plastic polyester resin layer, said polyester resin is comprised of oriented crystals, wherein the heat of fusion of said polyester resin is not less than 15 J/g.

2. A resin-coated aluminum seamless can body according to claim 1, wherein the can is formed by using an aluminum plate that has been coated with polyester resin wherein the thickness of aluminum plate that has been coated with polyester resin is decreased not less than 50% of the initial thickness of the plate by draw-ironing and/or stretch drawing.

3. A resin-coated aluminum seamless can body according to claim 1, wherein the can is formed by using an aluminum plate that has been coated with polyester resin, wherein the thickness of aluminum plate that has been coated with polyester resin is decreased not less than 50% of the initial thickness of the plate by draw-ironing or stretch-drawing.

4. A resin-coated aluminum seamless can body according to claim 1, wherein the inner and outer surface of the can is coated with the thermo-plastic resin layer.

5. A resin-coated aluminum seamless can body formed by draw-ironing and/or stretch-drawing, featuring superior resistance against cracks in the can wall during distribution, wherein the inner and/or outer surface of the can is coated with a thermo-plastic polyester resin layer, said polyester resin layer is comprised of oriented crystals, and the parameter H, which represents the axial orientation degree of the oriented crystals of said polyester resin layer in the direction of height of the can, is H≧0.5, wherein the heat of fusion of said polyester resin layer (A) is not less than 15 J/g.

* * * * *